UNITED STATES PATENT OFFICE 2,684,931

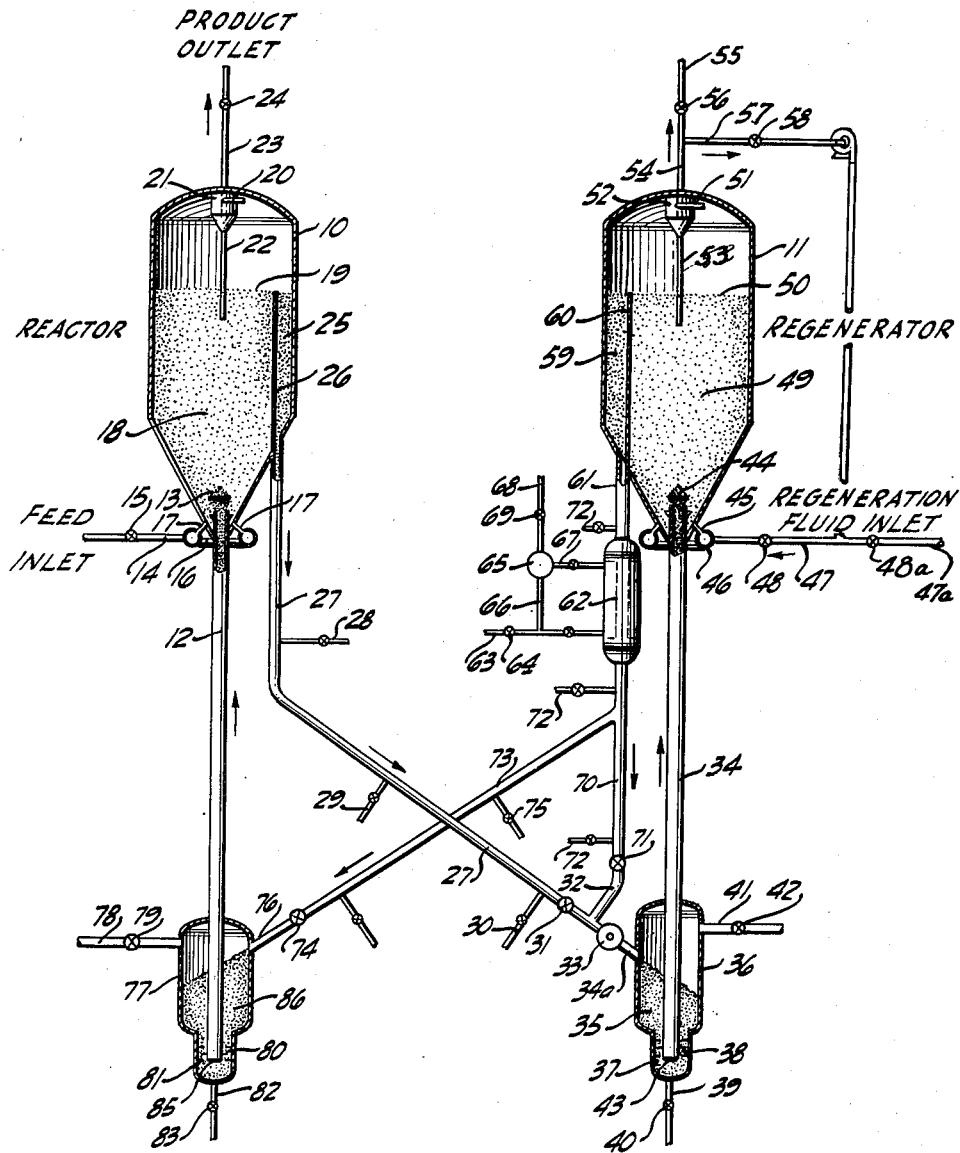

FLUIDIZED SOLIDS PROCESS FOR CONTACTING SOLIDS AND VAPORS WITH THE CONVEYANCE OF THE SOLIDS IN DENSE PHASE SUSPENSION

Clyde H. O. Berg, Long Beach, Calif., assignor to Union Oil Company of California, Los Angeles, Calif., a corporation of California Application August 20, 1949, Serial No. 111,554

16 Claims. (Cl. 196—52)

This invention relates to an improved process and apparatus for the contacting of gaseous fluids with finely divided granular solids in a system wherein the granular solids are maintained suspended in a condition of hindered settling in the gaseous fluid. This invention further relates to a particular improvement in such contacting processes which involves the methods by which the granular solids are introduced into the contacting vessels.

Such operations involving contact of powdered solids in gases are well known as fluidized processes in the industrial arts, particularly in petroleum conversion processes such as catalytic hydrocarbon cracking. In this process the hydrocarbon oil to be cracked is vaporized and introduced together with a hydrocarbon cracking catalyst in a finely divided or powdered condition. A suspension of particles in the hydrocarbon vapors results permitting intimate contact of the vapors with the catalyst. Spent catalyst coated with a carbonaceous deposit is formed together with products of conversion and the two are separately removed from the reaction vessel whereupon the spent catalyst particles are resuspended in an oxygen-containing regeneration fluid and conveyed to a regeneration vessel where the carbonaceous residue is burned off. The regenerated catalyst particles are subsequently returned to contact further quantities of the hydrocarbon to be cracked. The same general steps of the operation apply to many other catalytic processes as well as to processes in which the granular solids are not catalytic in nature but merely serve as adsorbents or as heat carriers as in thermal coking or cracking processes.

Regardless of the chemical nature of the solids involved, certain difficulties arise in the handling of finely divided solids in the form of suspensions in the "fluid" processes. It has been noted that considerable erosion occurs particularly in the arcuate inlet conduit to the "fluid" vessel which is due to attrition and abrasion of the suspended particles impinging against the inner surfaces. In fluid operations in which many hundreds of tons of powdered solids are handled per day through a given conduit such an erosion problem becomes very serious and extensive measures have been taken to reduce this erosion. The present invention is directed primarily to an improved method and apparatus for effecting fluidized processes whereby not only the erosion of conduit walls is reduced to a negligible value, but considerable flexibility of the process is introduced as well as markedly reducing the attrition rate of the granular solids by abrasion to nonrecoverable fines.

It is an object of the present invention to provide an improved process for contacting granular solids while suspended in a gaseous medium.

An additional object of this invention is to provide an improved fluidized process whereby considerable difference in operating pressure between the reactor and regenerator is permitted without the requirement of sealing legs of extensive length.

A further object of this invention is to provide an improvement whereby erosion of equipment in which gaseous suspensions of solids are conveyed is reduced to a negligible minimum.

Another object of this invention is to provide an improved means for introducing the granular solids into the contacting vessels of the well known fluid processes.

An additional object of this invention is to provide an improved apparatus for carrying out fluid processes.

Other objects and advantages of this invention will become apparent to those skilled in the art as the description and illustration thereof proceeds.

Briefly, the present invention comprises an improved "fluidized process" wherein finely divided granular solids such as catalyst particles are conveyed in substantially compact form under the influence of a lift gas instead of as an "aerated" suspension into a contacting vessel. Herein the granular solids are suspended and contacted with a gaseous fluid. The granular solids after contact are withdrawn from the contacting vessel, conveyed by gravity to a point below a second contacting vessel, and are introduced in substantially compact form into the bottom of the second contacting vessel wherein they are dispersed to form a suspension. This second contacting vessel may be a regenerator wherein the granular solids are converted to a form satisfactory for use in the first contacting vessel.

The improvement in the present invention arises from the fact that the granular solids are conveyed from one vessel to another in substantially compact form in the absence of moving mechanical parts. In no part of the process other than in the contacting vessels are the granular solids moving at relatively high velocity in the form of suspensions, and therefore, virtually all erosion in apparatus employed to transport the solids has been eliminated.

In the present invention the term "substantially compact form" as applied to granular solids indicates a bulk density which is substantially the same as the bulk density as those particular granular solids when they are at rest and are not subject to the passage therethrough of any flow of gas. The condition in which the granular solids are conveyed into each contacting vessel is substantially different as regards bulk density than the condition of the granular solids when present in the contacting vessel. As is well known, the granular solids present in the vessels employing the "fluid principle" are in turbulent suspension and settling of the particles is hindered by an upward flow of gaseous fluid. An interface forms within the vessel separating a dense phase suspension below from a dilute or light phase above the interface which contains considerably less suspended solids than the dense phase. The bulk density of the dense phase suspension may vary from less than 10% to as high as 40% or 50% of that of the bulk density of the compact solids while the dilute or light phase above the interface has a bulk density of from less than about 0.1% to as high as 10%. The dense phase takes on the appearance during operation of a boiling liquid in which considerable turbulence is present. An extremely good contact of the suspended solids with the suspending or aerating gas to be contacted is effected.

In the lift lines conveying solids into such a fluid reactor according to this invention, the granular solids are maintained by the steps and means hereinafter more fully described in a state of compaction whereby the bulk density of the granular solids in the lift line is substantially the same as that of the granular solids when they are at rest and unaerated. By conveying granular solids in such a state of compaction according to this invention, relatively lower solid particle velocities are possible to convey a given weight of solids through a conduit, the solids are prevented from motion relative to one another and the solids are prevented from impinging against metal surfaces within the apparatus whereby the main causes of erosion of the conveying apparatus and attrition of the solids is prevented.

A lift gas, which may comprise a portion of the gas to be contacted or may be a separate lift gas, is depressured concurrently through the interstices of the compact granular solids present within the lift line setting up frictional forces on the solid particles. These frictional forces generate a pressure drop and cause the mass of granular solids to pass through the lift line or conduit as a moving bed of granular solids. To prevent the lift gas thus flowing from suspending the granular solids in the lift line and reducing the bulk density of the mass from the unaerated compact bulk density, a compressive force is applied to the granular solids issuing from the upper extremity of the lift line into the contacting vessel. Special means hereinafter described are provided for dispersing granular solids thus introduced to form the fluidized dense phase suspension utilized in the contacting vessels.

In the improved fluid process of the present invention, two contacting vessels are employed, one for effecting the desired reaction in the presence of the granular solids and the other for regenerating the solids in one manner or another. Each of such vessels is provided with an improved lift line briefly described above.

The present invention may be more clearly described and understood upon reference to the accompanying drawing which represents an elevation view of the combined apparatus of the present invention showing two vessels for fluidized solids contact as well as the improved means for conveying granular solids between such vessels.

The drawing will be described in connection with the application of the apparatus to the catalytic cracking of a hydrocarbon fraction boiling between about 400° F. and 750° F. It is to be understood, however, that this specific description is not intended as a limitation of the application of the present invention to hydrocarbon cracking specifically for the principles herein disclosed may be applied to other fluid contacting processes such as desulfurization, thermal coking and cracking, hydroforming, hydrogenation, water gas generation, and many other fundamental industrial operations in which a fluidized or suspended solid is interacted with a suspending gas.

Referring now to the drawing, reactor vessel 10 and regeneration vessel 11 are provided in which the contact between the gas oil vapor and the powdered catalyst and the regeneration of the spent catalyst are effected. Regenerated powdered catalyst, an acid treated naturally occurring clay having a mesh size of above 100 mesh, is introduced into reaction vessel 10 via lift line 12 under the influence of a depressuring lift gas hereinafter more fully described. The solids are maintained in substantially compact form within lift line 12 and at a bulk density of between about 30 and 70 pounds per cubic foot depending on the type of catalyst used due to the compressive force exerted by thrust plate 13 on the solids issuing from the lift line. Gas oil vapors at a temperature of between 900° F. and 950° F. are introduced via line 14 at a rate controlled by valve 15 into feed inlet header 16 which surrounds the apex of the conical bottom of reactor 10 as well as the upper discharge extremity of the lift line 12. A series of ducts 17 connect header 16 with the lower part of reaction vessel 10 whereby the incoming vapors to be cracked are jetted into the powdered catalyst discharged from lift line 12 suspending it and forming a dense phase suspension 18 containing about 15 to 20 pounds of catalyst per cubic foot below interface 19. Above interface 19 a dilute suspension of spent powdered catalyst, 1 to 5 pounds per cubic foot, is maintained and which is removed from vessel 10 by passage through cyclone separator 21 wherein the suspended catalyst particles are separated from the reaction products and returned via line 22 to dense phase 18. Subsequently, the reaction products are passed via line 23 controlled by valve 24 from reaction vessel 10 to further processing facilities not shown. These reaction products constitute cracked gas oil including a 35% yield of cracked gasoline together with hydrocarbon gases in the vapor phase.

A carbonaceous deposit builds up upon the catalyst particles after contact with the gas oil vapor whereby the catalyst activity declines. Spent catalyst particles are removed from dense phase suspension 18 by allowing them to settle in a nonaerated space 25 between partition 26 and the wall of vessel 10. The spent powdered catalyst thus accumulating withdrawn from space 25 via transfer line 27 in which the solid particles are maintained as a dense aerated suspension having a bulk density of 20–25 pounds per cubic foot by introducing small quantities of aeration gas via lines 28, 29 and 30 thus preventing the solids from coalescing and plugging transfer line 27. The flow rate of granular solids through line 27 is controlled by valve 31. The spent granular solids are subsequently combined if desired with a recirculated fraction of regenerated catalyst flowing through line 32 and then passed through pressuring means 33 whereby the gas pressure existing in the interstices of the granular solids is increased by an amount equal to the pressure differential existing across lift line 34 plus any positive difference in pressure between the regenerator vessel 11 and reaction vessel 10. The combined stream of catalyst then passes via line 34a into induction zone 36. This pressure device may comprise a star feeder, a series of intermittently filled and emptied pressure vessels, or other known devices for passing granular solids from a low pressure zone to a high pressure zone.

The granular solids thus pressured form accumulation 35 in induction zone 36. Induction zone 36 is a pressure chamber and is provided at its lower extremity with solids check valve 37 by means of which granular solids may pass from induction zone 36 into lift line 34 under a positive pressure differential but are prevented from flowing in the reverse direction under a reverse pressure differential. Check valve 37 is provided with baffles 38 as well as outlet 39 controlled by valve 40. Lift line 34 extends downwardly through induction chamber 36 and is terminated in restriction 43 in check valve 37. Induction zone 36 is further provided with lift gas inlet 41 controlled by valve 42 whereby lift gas under pressure is introduced for depressuring upwardly through lift line 34. The lift gas thus introduced passes downwardly through accumulation 35, through restriction 43 and conveys granular solids in compact form upwardly through lift line 34 against thrust plate 44 in regenerator vessel 11. The granular catalyst thus introduced into vessel 11 is dispersed to form a suspension by the action of the regeneration fluid introduced via ducts 45 connecting regenerator fluid header 46 with the lower portion of regeneration vessel 11. Regeneration gases are introduced into header 46 via line 47 controlled by valve 48.

A dense phase suspension 49 containing from 15 to 25 pounds of powdered catalyst per cubic foot and having upper interface 50 is maintained within vessel 11. The carbonaceous deposit on the powdered catalyst particles is burned off at a temperature controlled below about 1050° F. under the influence of an oxygen-containing regeneration fluid. The flue gas formed passes via line 51 into cyclone separator 52 wherein the 1 to 5 pounds per cubic foot of suspended regenerated particles in the dilute phase are separated and returned via line 53 to dense phase suspension 49. The flue gas is passed via line 54 from separator 52 for discharge to the atmosphere, if desired, via line 55 controlled by valve 56. At least a portion of the flue gas thus formed is desirably passed via line 57 controlled by valve 58 for recirculation through regeneration vessel 11 and into which is introduced a small quantity of oxygen such as air controlled in accordance with the temperature of the regeneration vessel.

The regenerated catalyst is allowed to settle in nonaerated space 59 between partition 60 and the wall of reaction vessel 11. It is withdrawn from this space as a 20 to 25 pound per cubic foot aerated suspension via line 61 and passed through waste heat boiler 62 whereby heat is removed from the regenerated catalyst particles by exchange with a cooling medium. Fresh water may be introduced via line 63 controlled by valve 64 and combined with unvaporized water removed from drum 65 via line 66 and introduced into waste heat boiler 62. The heated fluid passes via line 67 into steam drum 65 from which high pressure steam is removed via line 68 controlled by valve 69. A portion of the thus cooled regenerated catalyst passes via transfer line 70 at a rate controlled by valve 71 through line 32 and back into induction zone 36 for recirculation through the regeneration zone. It is often desirable in fluid catalyst regeneration processes to maintain such a recirculation of catalyst for the purposes of temperature control. Aeration gas is introduced at points along lines 61 and 70 by means of lines 72 to prevent plugging by the regenerated catalyst passing therethrough and to maintain the particles as a suspension. The remaining portion of regenerated catalyst is passed via line 73 through pressuring device 74 which performs a similar function as pressuring device 33. Aeration gas is introduced into transfer line 73 by means of lines 75 to maintain the regenerated catalyst as a suspension and prevent plugging. The regenerated catalyst passes via line 76 at an increased pressure into induction vessel 77 which is of similar construction to induction vessel 36. It is provided with lift gas inlet 78 controlled by valve 79 and with solids check valve 80 provided with baffles 81 and with outlet 82 controlled by valve 83. Lift line 12 extends downwardly through induction vessel 77, check valve 80 and is further provided with restriction 85 at its lower inlet extremity. The lift gas passes downwardly through solids accumulation 86 maintained therein in substantially compact form at a higher bulk density than employed in transfer lines 27, 61, 70, 73, and 76, through restriction 85 and upwardly concurrent with the flow of substantially compact regenerated catalyst through lift line 12. It then discharges from lift line 12 into the lower end of reaction vessel 10 at which point it is dispersed in the incoming gas oil vapor feed at a catalyst to oil ratio which may vary between 1 and as high as 15 but usually about 2 to 5.

The lift gas employed in lift line 34 for conveying the spent granular solids into the regeneration vessel may comprise either flue gas recirculated from the regeneration vessel or steam or a mixture of the two. The lift gas employed in conveying regenerated powdered catalyst through lift line 84 may comprise steam or flue gas and also may comprise, if desired, a portion of the gas oil feed. Other suitable lift gases include a depressuring stream of hydrocarbon material such as natural gas, cracked gas, or liquefiable hydrocarbon gases or mixtures thereof containing propane, butane, and the like. If it is desired to eliminate the introduction of extraneous materials such as lift gas or steam into the reactor a convenient lift gas comprises the gaseous fraction separated from the cracked product removed from the reactor via line 23 and consists of hydrogen, methane and unsaturated and saturated normally gaseous hydrocarbons.

The magnitude of the pressure drop existing across the lift line employed in the present invention may vary between limits of about 0.06 to as high as about 1.0 pounds per square inch per foot or higher. The relationship which this pressure differential bears to the bulk density of the granular solids conveyed through the lift line is very characteristic of and peculiar to the method for solids conveyance employed. In all the nonmechanical types of conveyors, that is, in those in which no moving mechanical parts are employed, a fluid is usually used as a conveying medium. Granular solids such as catalysts are conveyed as in the form of suspensions in which an increase in velocity naturally increases the pressure drop existing across the lift line. In a previously proposed method for solids conveyance the lift line was filled with a dense phase aerated suspension of solids which were conveyed therethrough by a displacement of introducing additional quantities of aerated solids into the bottom of the line. Increasing the rate of aeration gas inherently decreases both the density of the suspension and the pressure drop across the lift line. In the lift line of the present invention increasing the rate of solids flow or of the lift gas results in no change in the bulk density of the solids in the lift line and no decrease in the pressure drop but rather an increase therein. The pressure drop existing in a lift line conveying aerated solids is a maximum value for a given length of lift line which cannot be exceeded, whereas the differential pressure in the lift line used in the present invention is without such upper limit. In fact a lift line having a given length may be employed, if desired, to sustain considerably higher pressure drops than those required for lifting or those equivalent to an equal column of aerated solids. This is one of the distinguishing physical features of the lift line according to the present invention which permits the considerable reduction in mechanical abrasion and catalyst particle attrition encountered in the conveyance of such solids in the form of suspensions.

The quantity of lift gas required to convey a given mass of granular powdered catalyst through the lift lines into the reaction and regeneration vessels is considerably reduced over that required in previous practice with fluidized catalyst. It has been found that as low as 0.02 to as high as about 1.0 standard cubic feet of gas is all that is required to convey one pound of granular catalyst a distance of about 75 feet. Formerly with suspensions of solids as high as from 5 to 15 standard cubic feet per pound were required. Very satisfactory conveyance is experienced in using quantities of lift gas ranging from 0.05 to 0.5 standard cubic feet per pound.

The velocity of solids flow through the lift lines may vary between limits as low as 0.1 to as high as about 5.0 feet per second and although higher velocities are possible they are usually not required because of the relatively high mass rates of flow which are possible in a relatively small conduit because of the high density of the solids being transferred. Very satisfactory solids velocities of between 0.5 and about 3.0 feet per second have been utilized.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for contacting powdered solids with a fluid which comprises establishing a conveyance zone opening into a contacting zone, passing powdered solids through said conveyance zone in substantially compact form by passing a conveyance fluid concurrently with said powdered solids through said conveyance zone at a rate sufficient to apply a moving force to and convey said powdered solids, applying a compressive force to said powdered solids issuing from said conveyance zone into said contacting zone thereby maintaining powdered solids in said conveyance zone at a bulk density substantially equal to the static bulk density of said solids when at rest and unaerated, forming a suspension of said powdered solids in said contacting zone by dispersing said solids in a fluid upon issuance into said contacting zone and removing said solids and said fluid from said contacting zone.

2. A process for contacting granular solids with a fluid which comprises establishing a contacting zone provided with a conveyance zone opening thereinto, introducing powdered solids at substantially their static bulk density into said conveyance zone, introducing a conveyance fluid into said conveyance zone, flowing said conveyance fluid through the interstices of the compact mass of powdered solids within said conveyance zone thereby moving said mass of solids toward said contacting zone, restricting the flow of powdered solids issuing from said conveyance zone by applying a compressive force to the issuing solids to maintain powdered solids in said conveyance zone during conveyance at a bulk density substantially equal to the static bulk density of said powdered solids when at rest and unaerated, introducing the fluid to be contacted into said contacting zone to disperse the powdered solids issuing from said conveyance zone, controlling the velocity of said fluid to be contacted through said contacting zone to maintain a dense phase suspension of powdered solids in a state of hindered settling and removing said powdered solids and said fluid from said contacting zone.

3. A process for contacting powdered granular solids with a fluid which comprises establishing an induction zone communicating through a conveyance zone with a contacting zone, introducing granular solids into said induction zone to form and maintain an accumulation thereof which submerges the inlet opening of said conveyance zone, introducing a conveyance fluid under pressure into said induction zone above the level of said accumulation, flowing said conveyance fluid through said conveyance zone concurrently with a moving mass of powdered solids conveyed thereby, applying a compacting force against the stream of solids issuing from said conveyance zone thereby maintaining said powdered solids in said conveyance zone and in said induction zone in substantially compact form at a bulk density substantially equal to the static bulk density of said powdered solids when at rest and unaerated, introducing the fluid to be contacted into said contacting zone so as to disperse the powdered solids issuing thereinto from said conveyance zone forming a dense phase suspension of powdered solids in said contacting zone, maintaining a dense phase and a dilute phase suspension of solids separated by an interface within said contacting zone, removing a gaseous fluid from above said interface substantially free of suspended powdered solids and withdrawing powdered solids from below said interface substantially free from occluded gaseous fluid.

4. In a process for contacting finely divided solids with a fluid wherein powdered solids are introduced into a contacting zone through a conveyance zone, a fluid to be contacted is introduced thereinto and a turbulent dense phase suspension of said powdered solids in said fluid is maintained within said contacting zone, the improvement which comprises eliminating conveyance zone erosion and powdered solids attrition by maintaining said powdered solids within said conveyance zone in unsuspended form at a bulk density substantially equal to the static bulk density of said powdered solids when at rest and unaerated and conveying said solids in said compact form through said conveyance zone by the steps of flowing a conveyance fluid concurrently with said solids through said conveyance zone at a rate sufficient to convey said solids, restricting the flow of powdered solids from said conveyance zone into said contacting zone by applying a compressive force to such issuing solids maintain said solids within said conveyance zone at a bulk density substantially equal to the static bulk density of said solids when at rest and unaerated and separately introducing the fluid to be contacted into said contacting zone to disperse said powdered solids and to form a dense phase suspension therein.

5. A process for chemical conversion of gaseous reactants in the presence of regeneratable powdered solids which comprises establishing a reaction zone and a regeneration zone, establishing a first conveyance zone communicating with said reaction zone and a second conveyance zone communicating with said regeneration zone, maintaining a turbulent dense phase suspension of powdered solids in said reactant gases in said reaction zone by passing a stream of said reactant gases therethrough at a controlled velocity maintaining a turbulent dense phase suspension of powdered solids in a regeneration gas in said regeneration zone by passing a stream of said regeneration gas therethrough at a controlled velocity, introducing regenerated powdered solids from said regeneration zone into said first conveyance zone to submerge the inlet opening thereof, passing a conveyance fluid through said first conveyance zone at a rate sufficient to convey said solids therethrough into said reaction zone, applying a compacting force against the stream of solids issuing from said first conveyance zone to maintain said solids during conveyance at a bulk density substantially equal to the static bulk density of said powdered solids when at rest and unaerated, dispersing said granular solids in said reactant gases in said reaction zone, passing spent powdered solids from said reaction zone to said second conveyance zone to submerge the inlet opening thereof, passing a conveyance fluid through said second conveyance zone at a rate sufficient to convey said solids therethrough into said regeneration zone, applying a compacting force against the stream of solids issuing from said second conveyance zone to maintain said solids during conveyance at a bulk density substantially equal to the static bulk density of said powdered solids when at rest and unaerated, dispersing the spent powdered solids in said regeneration gases to form a dense phase suspension thereof and removing the fluids from each of said reaction and regeneration zones.

6. A process according to claim 5 including the step of passing a portion of regenerated powdered solids removed from said regeneration zone through a temperature control zone to said second conveyance zone, combining said portion of regenerated powdered solids with said spent powdered solids removed from said reaction zone, conveying the mixture of powdered solids thus formed into said regeneration zone and maintaining the recirculating stream of powdered solids through said regeneration zone to control the temperature therein.

7. A process according to claim 5 wherein the bulk density of the mass of powdered solids conveyed through said conveyance zones is substantially greater than the bulk density of said dense phase suspensions maintained within said reaction and regeneration zones and is also substantially greater than the bulk density of powdered solids removed from said reaction and regeneration zones.

8. A process for the catalytic cracking of hydrocarbons in the presence of finely divided powdered cracking catalyst which comprises establishing a first induction zone communicating through a first conveyance zone into a reaction zone, establishing a first transfer zone communicating said reaction zone with a second induction zone, establishing a second conveyance zone communicating said second induction zone with a regeneration zone, establishing a second transfer zone communicating said regeneration zone with said first induction zone, passing regenerated powdered catalyst from said regeneration zone through said second transfer zone as a dense phase aerated suspension to said first induction zone to form and maintain a compact accumulation of solids therein submerging the inlet opening of said first conveyance, introducing a first conveyance fluid into said first induction zone above the level of said accumulation of solids, flowing said conveyance fluid through said first conveyance zone at a rate sufficient to convey a moving mass of substantially compact regenerated powdered catalyst into said reaction zone, applying a compacting force against the catalyst issuing from said first conveyance zone to maintain said catalyst therein at a bulk density substantially equal to the static bulk density of said catalyst when at rest and unaerated, dispersing regenerated catalyst issuing there into in a vaporized hydrocarbon fraction forming a turbulent dense phase suspension of said catalyst in said hydrocarbon, removing cracked hydrocarbon gases and vapors from said reaction zone substantially free of suspended catalyst, maintaining hydrocarbon cracking conditions of pressure and temperatures within said reaction zone, removing spent powdered catalyst from said reaction zone through said first transfer zone to said second induction zone as a dense aerated suspension to form and maintain a substantially compact accumulation of said catalyst therein to submerge the inlet opening of said second conveyance zone, introducing a second conveyance fluid into said second induction zone at a point above the level of said accumulation of solids therein, flowing said second conveyance fluid through said second conveyance zone at a rate sufficient to convey a moving mass of substantially compact spent powdered catalyst therethrough into said regeneration zone, applying a compacting force to the stream of catalyst issuing from said second conveyance zone to maintain the bulk density of said catalyst therein substantially equal to the bulk density of said catalyst when at rest and unaerated, dispersing the thus conveyed spent catalyst in said regeneration gases to form a turbulent dense phase suspension in said regeneration zone, removing regeneration gas from said regeneration zone substantially free from suspended to powdered catalyst and recirculating said powdered catalyst from said regeneration zone to said reaction zone to contact further quantities of said hydrocarbon fraction.

9. A process according to claim 8 in combination with the steps of maintaining the density of said turbulent dense phase suspension in said reaction zone between about 15 and about 20 pounds per cubic foot, maintaining the density of the turbulent dense phase suspension within said regeneration zone between about 15 to about 25 pounds per cubic foot, maintaining the density of the aerated powdered solids within said transfer zones between about 20 and about 25 pounds per cubic foot and maintaining the bulk density of the powdered catalyst within said first and second conveyance zones at the substantially compact bulk density of the powdered catalyst employed.

10. A process according to claim 8 wherein said regeneration gases comprise a major proportion of flue gas removed from said regeneration zone combined with a small controlled quantity of an oxygen-containing gas, the quantity of which is determined by the temperature to be maintained in the regeneration zone.

11. A process according to claim 8 wherein said regenerated powdered catalyst removed from said regeneration zone is cooled from regeneration temperatures to reaction temperatures by passage through a heat removal zone, and wherein a portion of the thus cooled regenerated powdered catalyst is reintroduced into said second induction zone for recirculation therefrom in substantially compact form concurrently with a depressuring lift gas into said regeneration zone in order to control the temperature thereof.

12. A process according to claim 8 wherein small quantities of an aeration gas is introduced into said first and second transfer zones to maintain the bulk density of powdered catalyst passing therethrough at substantially less than the static bulk density of the powdered catalyst when nonaerated.

13. A process for contacting powdered solids with a stream of fluids which comprises establishing a contacting zone and a conveyance zone for powdered solids communicating therewith, submerging the inlet opening of said conveyance zone with an accumulation of powdered solids to be conveyed, flowing a conveyance fluid through said conveyance zone into said contacting zone at a rate sufficient to convey said powdered solids therethrough, applying a compacting force to the stream of solids issuing from said conveyance zone to maintain said powdered solids therein during conveyance at a bulk density substantially equal to the static bulk density of said powdered solids when at rest and unaerated, subsequently dispersing said stream of powdered solids issuing into said contacting zone to form a fluidized body of said solids therein, introducing a fluid to be contacted into said contacting zone and removing powdered solids and fluids following contact from said contacting zone.

14. A process according to claim 5 wherein said reactant gases are hydrocarbon vapors and wherein said regeneration gas contains oxygen.

15. A process according to claim 14 wherein said regenerable powdered solids comprise a hydrocarbon conversion catalyst.

16. A process according to claim 15 wherein said catalyst comprises a hydrocarbon cracking catalyst.

References Cited in the file of this patent

UNITED STATES PATENTS

| Number | Name | Date |
| --- | --- | --- |
| 2,361,978 | Swearingen | Nov. 7, 1944 |
| 2,401,739 | Johnson | June 11, 1946 |
| 2,412,152 | Huff | Dec. 3, 1946 |
| 2,413,479 | Wiegand | Dec. 31, 1946 |
| 2,436,486 | Scheineman | Feb. 24, 1948 |
| 2,487,961 | Angell | Nov. 15, 1949 |
| 2,488,030 | Scheineman | Nov. 15, 1949 |

OTHER REFERENCES

"Houdriflow," Oil and Gas Journal, vol. 47, January 13, 1949, pages 78 and 79.